(12) United States Patent
Adam et al.

(10) Patent No.: US 6,345,860 B1
(45) Date of Patent: Feb. 12, 2002

(54) VEHICLE ROOF

(75) Inventors: Wolfgang Adam, Nagold; Oliver Braun, Kirchheim; Erich Ruehinger, Magstadt; Wolfram Salz, Vaihingen/Enz; Matthias Aydt, Eberdingen; Berthold Klein, Rutesheim; Lothar Reiff, Markgroeningen, all of (DE)

(73) Assignee: CTS Fahrzeug-Dachsysteme GmbH, Korntal-Münchingen (DE)

( * ) Notice: Subject to any disclaimer, the term of this patent is extended or adjusted under 35 U.S.C. 154(b) by 0 days.

(21) Appl. No.: 09/610,421

(22) Filed: Jul. 5, 2000

(30) Foreign Application Priority Data

Jul. 5, 1999 (DE) ......................... 199 30 977

(51) Int. Cl.⁷ ............................... B60J 7/057
(52) U.S. Cl. ................... 296/223; 296/220.01
(58) Field of Search .................. 296/220.1, 223; 49/352

(56) References Cited

U.S. PATENT DOCUMENTS

| | | | |
|---|---|---|---|
| 4,659,140 A | 4/1987 | Fuerst et al. | 296/223 |
| 5,069,502 A | 12/1991 | Sekine et al. | 296/223 |
| 5,169,206 A | * 12/1992 | Omoto et al. | 296/219 |
| 5,335,961 A | * 8/1994 | Reinsch et al. | 296/223 X |

FOREIGN PATENT DOCUMENTS

| | | | |
|---|---|---|---|
| DE | 33 16 739 | 1/1984 | |
| DE | 33 16 739 C2 | 1/1984 | |
| DE | 3417861 | * 11/1985 | ................. 296/223 |
| DE | 35 45 869 C2 | 10/1986 | |
| DE | 196 50 160 A1 | 6/1998 | |
| DE | 197 34 815 C1 | 6/1998 | |
| EP | 0368405 | * 5/1990 | ................. 296/223 |
| EP | 0 723 903 A1 | 7/1996 | |
| FR | 2019977 | 10/1970 | |

OTHER PUBLICATIONS

Copy of Search Report.

* cited by examiner

*Primary Examiner*—Dennis H. Pedder
(74) *Attorney, Agent, or Firm*—Crowell & Moring LLP

(57) ABSTRACT

A vehicle roof for a motor vehicle has a roof part which can be moved in the longitudinal direction and can be adjusted between a closed position which closes a roof opening in the motor vehicle and an open position which releases the roof opening. Furthermore, a driving motor is provided which drives, via at least one driving pinion, two driving cables which adjust the roof part and are guided along both sides of the roof 15 opening.

In order to provide a drive for a vehicle roof the drive has good operational reliability and provides sufficiently high power, yet at the same time being of small construction. Each driving cable is assigned a respective motor-operated driving pinion.

8 Claims, 3 Drawing Sheets

VEHICLE ROOF

BACKGROUND OF THE INVENTION

The present invention is concerned with a vehicle roof for a motor vehicle, having a roof part which can be moved in the longitudinal direction of the vehicle and can be adjusted between a closed position closing a roof opening in the motor vehicle, and an open position releasing the roof opening and having a motorized drive having at least one driving pinion for driving two driving cables which adjust the roof part and are guided along both sides of the roof opening.

A vehicle roof of this type is disclosed in DE 33 16 739 C2. A driving unit for a vehicle roof has a plurality of adjustable roof segments which are arranged one behind another in the longitudinal direction of the vehicle and in the closed position close a roof opening, and in the open position are pushed together or moved into the upright position, so that the roof opening is released. For the transfer between the closed position and open position a driving motor having a driving pinion is provided to drive two driving cables which are stiff in terms of compression and are connected to the segments. The driving motor and the driving pinion are arranged in the region of the front side of the roof opening, the driving pinion acting simultaneously on both driving cables.

The driving unit consisting of the driving motor and the driving pinion in the region of the roof front side has to be of small construction because of the restricted spatial conditions, in particular because of the small roof thickness; otherwise, fittings obstructing the interior of the vehicle are required. On the other hand, the driving motor has to have sufficiently high power available so that the increased friction on account of the plurality of individual movable segments can be overcome, and the vehicle roof can be opened and closed reliably. However, the motor power needed can only be provided by means of a motor of sufficient size.

According to DE 33 16 739 C2, the conflict between the size of the motor and motor power is resolved by a large driving motor, but this restricts the space in the vehicle interior, in particular the headroom.

DE-AS 25 08 106 discloses a drive for a motor vehicle roof, which comprises two driving cables on the two sides of an adjustable roof portion. The driving cables are each driven by a driving pinion, which in turn is driven by a drive shaft of a common drive motor. The drive motor is arranged in the center of the vehicle roof. The two drive shafts bridge the distance between the roof center and the roof side, along which the respective driving cable with the driving pinion extends. Since a drive shaft each extends to the left and to the right side of the roof, it is necessary for reasons of symmetry to place the drive motor precisely in the roof center. This limits the design options for the drive of the roof part. Furthermore, care must be taken that the drive motor, which is arranged in the area of the vehicle roof that is fixed to the body immediately adjacent to the wind shield frame, does not collide with the sealing devices on the vehicle roof.

SUMMARY OF THE INVENTION

An object of the present invention is to overcome the problem of specifying a drive for a vehicle roof, with a drive having good operational reliability and providing sufficiently high power, yet at the same time, being of small construction.

According to the invention, this problem is solved by assigning driving cables to a respective motor-operated driving pinion.

According to the invention, provision is now made for each of the two driving cables, via which the roof part is adjusted at its two end sides between an open and closed position, in each case to be acted upon by a driven driving pinion. This makes it possible to position the driving pinions at different locations and to take design and structural conditions into consideration. The division into two driving pinions means that the position of the driving pinions can be varied to a greater extent than in the prior art and that a flexible construction can be achieved.

According to a first advantageous configuration, provision is made for the two driving cables to be driven via a common driving motor which acts directly or indirectly on two driving pinions. In this embodiment, a first driving pinion drives one of the two driving cables, and the second driving pinion is situated between the driving cables and transmits the driving movement from the first to the second driving cable. This configuration has the advantage that only one motor is needed for driving both cables and yet each cable is assigned a driving source, as a result of which delays in the drive, due to elastic or plastic behavior of the driving cables, are avoided. A further advantage resides in the fact that the driving movement of the two cables is synchronized automatically via the driving pinion situated between the two cables.

The two driving pinions can be positioned on different sides of the roof opening, the first driving pinion, which is driven directly by the motor, advantageously being arranged in the lateral region of the roof opening, and the second driving pinion advantageously being arranged in the region of the front side of the roof opening where the two driving cables advantageously overlap. In principle, the driving motor may be placed in the lateral region over the entire length of the roof opening, but optionally also in the region of the front edge or of the rear side of the roof opening.

According to a second advantageous embodiment, two driving motors each having a driving pinion are provided, each driving cable being assigned a respective driving motor having a driving pinion. Since the overall power to be produced is distributed to a plurality of motors, the motors can be sized smaller to reduce the space required for each motor. On the other hand, however, higher power values may also be achieved because of the plurality of motors. A further advantage of this configuration resides in the fact that the driving forces acting on each cable are reduced because each cable is driven directly by the motor assigned to it and the power requirement is orientated to only one cable to be driven. The reduced driving forces increase the service life of the device and make it possible to use components which are of a lesser size and are more cost-effective. In addition, through the use of identical parts, in particular driving motors and pinions of identical construction, simplifications in terms of design and reductions in costs are achieved.

It may optionally be appropriate to provide more than two driving motors having a corresponding number of driving pinions.

In a preferred development of the embodiment having two driving motors, a synchronizing pinion is provided between the two driving cables. The pinion has the task of synchronizing the movement between the two cables in order to prevent differences in speed in the cables and the risk of twisting in the cables, and sloping position or tilting of the roof part. The synchronizing pinion is expediently arranged in the region of the front side of the roof opening, in particular in the center of the front side.

The roof part is expediently of multipart configuration and consists in particular of a plurality of individual segments which are arranged one behind the other, are acted upon by the driving cables and are adjusted between the open and closed position.

The driving motors are both advantageously arranged either in the lateral region or in the region of the front side, in particular mirror-symmetrically with respect to a longitudinal central plane of the vehicle, in order to achieve a uniform distribution of force over the length of the driving cables.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

In the following description, identical components are referred to by the same reference numbers in the different embodiments described hereinbelow.

Figure 1:
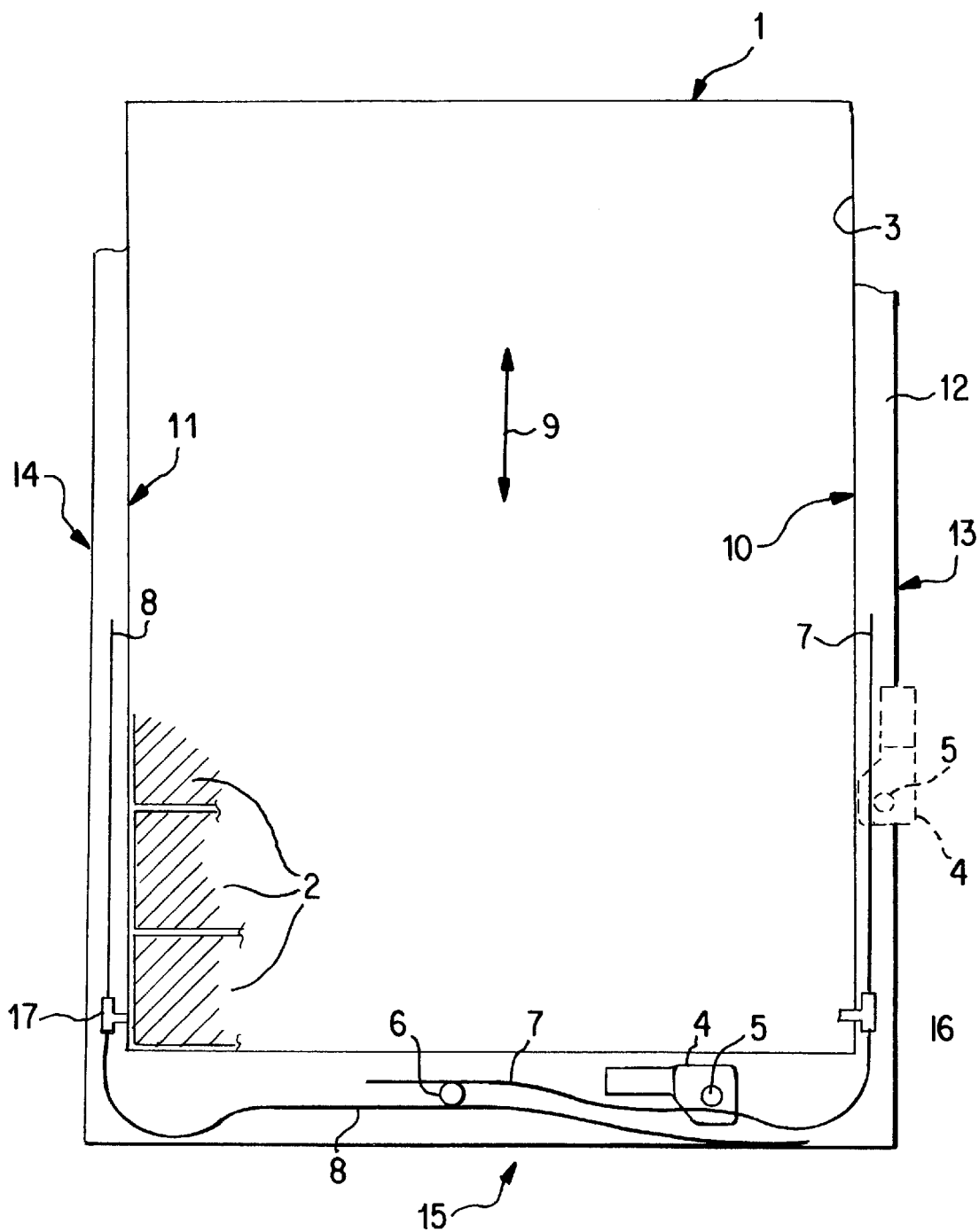
FIG. 1 is a plan view of a motor vehicle having a segmental roof with a driving motor.

The vehicle roof I illustrated in FIG. 1 has a roof opening 3 spanned by a plurality of segments 2. The segments 2 extend transversely to the longitudinal direction 9 of the vehicle and are guided movably in the longitudinal direction 9 of the vehicle in lateral guide rails 10, 11 which bound the roof opening 1 laterally and are integrated in an encircling roof frame 12 of the vehicle roof 1. The segments 2 can be transferred or moved from the closed position, which is illustrated in FIG. 1 and in which the roof opening 3 is completely closed, into an open position in which the roof opening 3 is at least partially opened. In this latter case, the segments 2 are expediently displaced in a translational manner in the longitudinal direction 9 of the vehicle and at the same time are moved into the upright position about a transverse axis running transversely to the longitudinal direction 9 of the vehicle.

The transfer from the closed position into the open position or vice versa is brought about by a driving unit which comprises a driving motor 4, two driving pinions 5, 6 and two respective driving cables 7, 8 which are stiff in terms of compression. The driving cables 7 and 8 each extend along a side region 13 and 14, respectively, in the roof frame 12. In these side regions, the driving cables are each connected to the end sides of the segments or to a kinematic arrangement guiding the segments. The driving cables, 8 are guided around a corner of the roof opening 3 adjacent to the front side 15 and run along the front side 15 of the roof opening. Fastenings 16, 17 are provided in the vicinity of the corner, via which the respective driving cables 7, 8 are fixed movably to the roof frame 12 and which provide guidance in the corner region. The two driving cables 7, 8 are arranged essentially mirror-symmetrically with respect to the longitudinal central plane of the vehicle. The two driving cables 7, 8 are of a finite length having two open end sides in each case.

The driving motor 4, which is an electric motor including gearing and which drives the first driving pinion 5, is arranged in the roof frame 12, in the region of the front side 15, offset laterally with respect to the longitudinal central plane of the vehicle. The first driving pinion 5 acts upon the first driving cable 7, as a result of which the segments are adjusted in the side region 13. A second driving pinion 6 meshes on opposite sides with the two driving cables 7, 8 and is arranged approximately in the center of the front side. The second driving pinion 6 transmits the drive from the first cable 7 to the second cable 8, the second cable 8 acting upon the segments 2 in the side region 14 opposite the first cable. Since the cables 7 and 8 engage on opposite sides of the second driving pinion 6, a unidirectional driving movement of the cables is automatically obtained.

The driving cables 7, 8 each extend approximately from the center of a side region 13, 14, respectively, to beyond the center of the front side 15, so that the second driving pinion 6 engages with the two driving cables 7, 8 both in the closed position and in the open position of the segments 2.

It may be expedient, if appropriate, to configure the driving cables such that they are continuous and to guide them around the entire roof opening 3. This has the advantage that the need for driving cables which are stiff in terms of compression can be dispensed with because the driving cables 7, 8 are subjected to tensile stress both during movement in the closing direction and during movement in the opening direction.

Furthermore, the installation position of the driving motor 4 can be varied. As is illustrated in FIG. 1 by dashed lines, the driving motor 4 having the driving pinion 5 can also be arranged in a side region 13 or 14.

It may also be expedient, moreover, to arrange the second driving pinion 6, which ensures the transmission of the movement from the first driving cable acted upon by the electric motor to the second driving cable, in a side region. It is also within the scope of the present invention to arrange both the driving motor and the second driving pinion in the region of the rear side of the roof opening.

The axes of the two driving pinions 5, 6 are advantageously aligned in an axially parallel manner and lie in particular perpendicularly or orthogonally to the longitudinal direction 9 of the vehicle.

Figure 2:
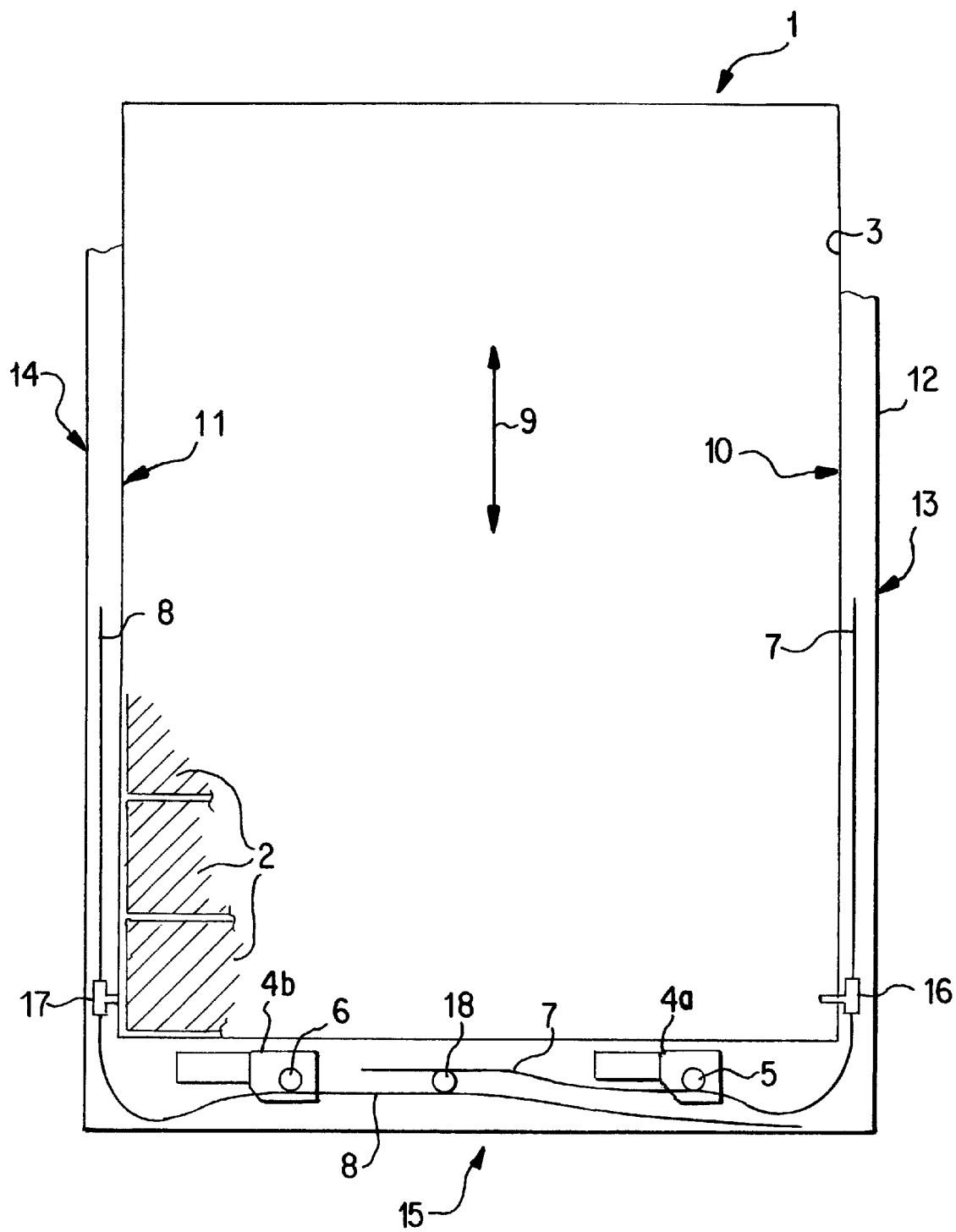
FIG. 2 is a plan view of a motor vehicle having a segmental roof with two driving motors.

The embodiment illustrated in FIG. 2 corresponds in basic structure with regard to the segmental roof to the preceding embodiment except as follows.

In contrast to the preceding embodiment, two driving motors 4a, 4b in the form of electric motors are now provided to drive driving pinions 5, 6, respectively, and to move each driving cable 7, 8, respectively. The two driving motors 4a, 4b are both arranged in the region of the front side 15 offset laterally with respect to the longitudinal central plane of the vehicle. The two driving motors can be expediently of identical design and configuration.

The driving motors 4a, 4b can also be arranged on the side regions 13, 14, in particular in a mirror-symmetrical position. Moreover, an arrangement on the rear region and a distributed arrangement laterally and at the front, laterally and at the rear or at the front and rear are also contemplated.

In the region of the front side 15, a synchronizing pinion 18 is arranged between the two driving cables 7, 8, the axis of rotation of the synchronizing pinion 18 expediently lying axially parallel to the rotation axis of the driving pinions 5, 6. The synchronizing pinion 18 only takes on the task of synchronizing the movements of the two driving cables 7, 8; in contrast, transmission of the drive from one cable to the second cable is not provided in this embodiment. The position of the synchronizing pinion 18 between the driving motors 4a, 4b is advantageously selected such that it is spaced equally from the two driving motors, so that longitudinal extensions of the driving cables between the particular driving motor and the synchronizing pinion take effect to approximately the same extent.

If appropriate, the drives are synchronized by electronic apparatus via a control of the rotational speed of the driving motors. In this case, the synchronizing pinion can also be dispensed with.

Figure 3:
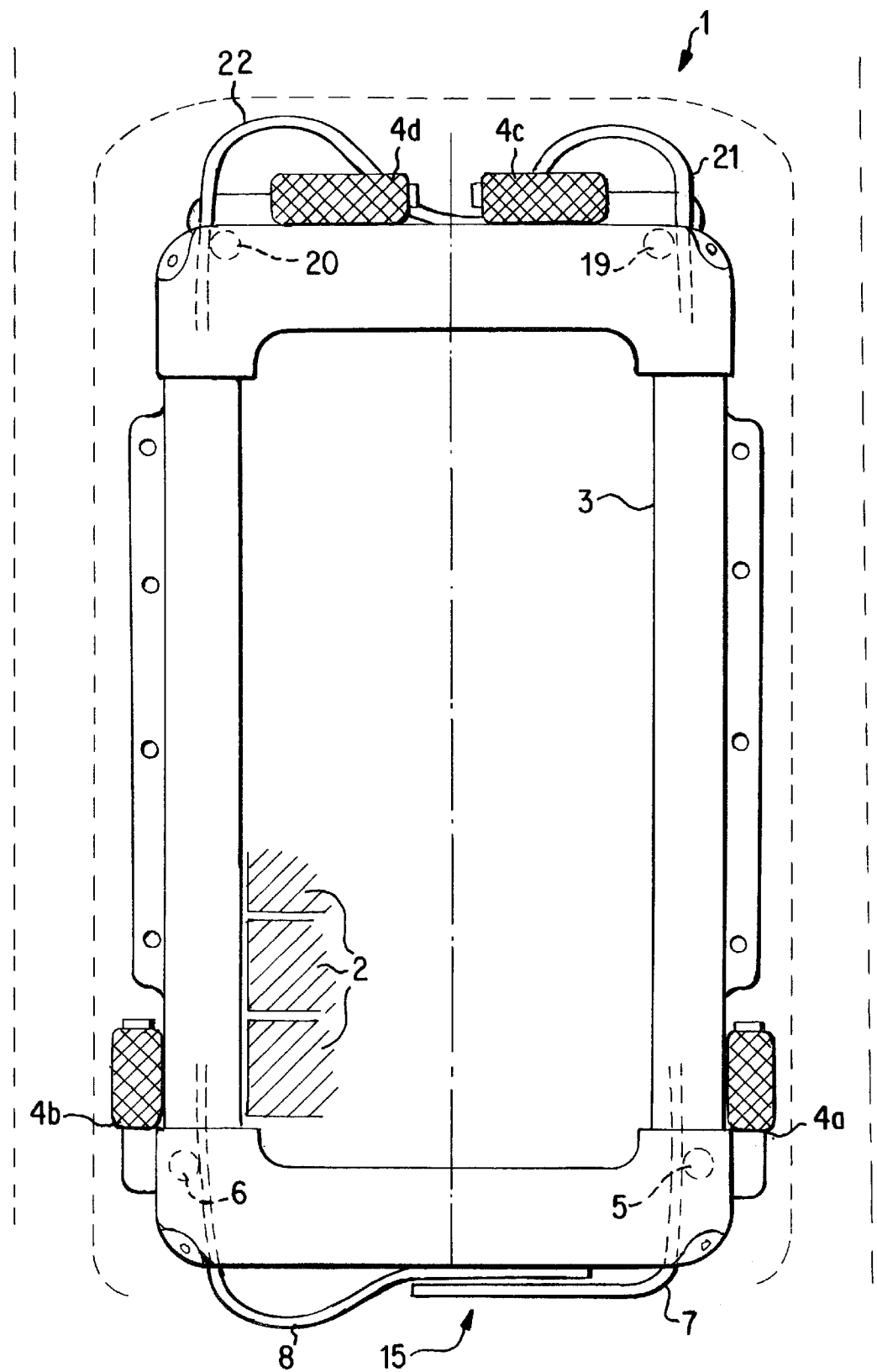
FIG. 3 is a plan view of a motor vehicle having a segmental roof with four driving motors.

In the embodiment according to FIG. 3, the segments 2 of the vehicle roof 1 are driven by four driving motors. Two driving motors 4a, 4b are each arranged in the side region in the vicinity of the front side 15; these driving motors 4a, 4b, which correspond in principle to the embodiment according to FIG. 2 and form a first driving assembly, drive two driving cables 7, 8 via driving pinions 5, 6, respectively. For the purpose of transmitting force and movement to the segments 2, the driving cables 7, 8 are connected on opposite end sides in the side region of the car roof to the segments 2 via a respective point of engagement. Depending on the direction of movement of the driving cables 7, 8, the segments 2 are displaced in the direction of the longitudinal direction of the vehicle or counter to the longitudinal direction of the vehicle in order to open and close the vehicle roof. The driving motors 4a, 4b are synchronized; if appropriate, a synchronizing pinion is arranged between the two driving cables 7, 8.

Two further driving motors 4c, 4d, which are likewise synchronized with respect to each other and form an additional driving assembly which can be actuated independently of the driving assembly formed by the first two driving motors 4a, 4b, are situated in the rear region opposite the front side 15. These further driving motors 4c, 4d are assigned two driving pinions 19, 20, respectively, which each drive a driving cable 21, 22, respectively. The two driving cables 21, 22 are connected to the segments 2 via additional points of engagement. These additional points of engagement differ from the points of engagement of the first two driving cables 7, 8 on the segments 2 with respect to their position in the longitudinal direction of the vehicle. This division into different points of engagement which are acted upon by different driving assemblies brings about a further degree of freedom in the movement of the segmental roof, which can be carried out independently of the movement caused by the first driving assembly. This makes it possible, for example, to open the segmental roof both beginning from the front and from the rear.

In a further expedient refinement of this configuration, each driving assembly consists of only one driving motor, the two driving motors being actuable independently of each other and each driving motor being assigned two driving cables. As in the embodiment according to FIG. 1, one of the driving cables is acted upon directly by a driving motor, whereas the transmission to the second driving cable in each case takes place via a further driving pinion which is arranged between the two driving cables.

It is furthermore contemplated to align the two driving motors of the additional driving assembly both longitudinally and transversely in the rear region of the segmental roof. A flexible shaft may also be used for the transmission of the drive from the driving motors to the driving pinions of the driving cables. If appropriate, the use of a gear step-up ratio may be advantageous. Other suitable transmission devices include rigid shafts via which the driving pinions are actuated by the driving motors. In addition, it may be appropriate to undertake the transmission of force from the driving motors to the segments by way of rigid shafts and toothed belts fitted in a secured manner on the lateral guide rails. Finally, endless toothed belts may also be provided, these being driven by the driving motors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle roof for a motor vehicle, comprising a roof part movable in a longitudinal direction of the vehicle and adjustable between a closed position, which closes a roof opening in the motor vehicle, and an open position which releases the roof opening, a motorized drive having at least one driving pinion and driving cables operatively connected with the motorized drive to adjust the roof part, the driving cables being guided along both sides of the roof opening and assigned respective motor-operated driving pinions, wherein the driving cables are arranged to be driven via a common driving motor configured to directly drive a first driving pinion which is configured to exclusively act upon a first of the driving cables and a second driving pinion is configured to exclusively drive a second one of the driving cables and to be driven by the first driving cable.

2. The vehicle roof as claimed in claim 1, wherein the second driving pinion is arranged in a front side region of the roof opening.

3. The vehicle roof as claimed in claim 1, wherein the driving cables are guided along a side region of the roof opening up to the second driving pinion in a front side region of the roof opening.

4. The vehicle roof as claimed in claim 1, wherein the common driving motor is placed in a side region of the roof opening.

5. The vehicle roof as claimed in claim 1, wherein the common driving motor is placed in a region of the front side of the roof opening.

6. The vehicle roof as claimed in claim 1, wherein the driving pinions have parallel rotation axes.

7. The vehicle roof as claimed in claim 1, wherein guide rails for guiding the roof part are arranged on both sides of the roof opening.

8. The vehicle roof as claimed in claim 1, wherein the movable roof part comprises a plurality of segments arranged one behind another in the longitudinal direction.

* * * * *